US012767756B2

(12) United States Patent
Chen et al.

(10) Patent No.: US 12,767,756 B2
(45) Date of Patent: Oct. 20, 2026

(54) COATING COMPOSITION AND ARTICLE INCLUDING COATING FORMED BY THE COATING COMPOSITION

(71) Applicant: Sherwin-Williams (Guangdong) New Material Co., Ltd., Guangdong (CN)

(72) Inventors: Hongbin Chen, Guangdong (CN); Song Niu, Guangdong (CN)

(73) Assignee: SHERWIN-WILLIAMS (GUANGDONG) NEW MATERIAL CO., LTD., Guangdong (CN)

(*) Notice: Subject to any disclaimer, the term of this patent is extended or adjusted under 35 U.S.C. 154(b) by 192 days.

(21) Appl. No.: 18/020,496

(22) PCT Filed: Aug. 31, 2021

(86) PCT No.: PCT/CN2021/115538
§ 371 (c)(1),
(2) Date: Feb. 9, 2023

(87) PCT Pub. No.: WO2022/048525
PCT Pub. Date: Mar. 10, 2022

(65) Prior Publication Data

US 2024/0010787 A1 Jan. 11, 2024

(30) Foreign Application Priority Data

Sep. 4, 2020 (CN) ........................ 202010919549.6

(51) Int. Cl.

| | |
|---|---|
| ***C08G 59/68*** | (2006.01) |
| ***C08G 59/14*** | (2006.01) |
| ***C08G 59/32*** | (2006.01) |
| ***C08L 63/00*** | (2006.01) |
| ***C09D 163/00*** | (2006.01) |

(52) U.S. Cl.
CPC ....... *C08G 59/686* (2013.01); *C08G 59/1494* (2013.01); *C08G 59/3218* (2013.01); *C08L 63/00* (2013.01); *C09D 163/00* (2013.01)

(58) Field of Classification Search
CPC .............. C08G 59/686; C08G 59/1494; C08G 59/3218; C08L 63/00; C09D 163/00
See application file for complete search history.

(56) References Cited

U.S. PATENT DOCUMENTS

| | | | |
|---|---|---|---|
| 6,376,579 B1 | 4/2002 | Mishra et al. | |
| 2018/0163084 A1 | 6/2018 | Gessner et al. | |
| 2022/0228016 A1* | 7/2022 | Niu ........................ | C08G 59/68 |

FOREIGN PATENT DOCUMENTS

| | | | |
|---|---|---|---|
| CN | 1034734 | A | 8/1989 |
| CN | 1327457 | A | 12/2001 |
| CN | 107646050 | A | 1/2018 |
| CN | 107660228 | A | 2/2018 |
| CN | 107667151 | A | 2/2018 |
| CN | 110105799 | A | 8/2019 |
| CN | 110240821 | A | 9/2019 |
| EP | 0326723 | A1 | 8/1989 |
| EP | 1162225 | A1 | 12/2001 |
| EP | 1174478 | A2 | 1/2002 |
| JP | 2004315690 | A * | 11/2004 |
| JP | 2008214567 | A * | 9/2008 |
| TW | 200517433 | | 6/2005 |
| WO | 2016166382 | A1 | 10/2016 |

OTHER PUBLICATIONS

Open Library, Enhanced Introductory College Chemistry, "Salt", online, https://ecampusontario.pressbooks.pub/enhancedchemistry/chapter/salts/ (Year: 2025).*
Machine Translation of Fujita (JP 2008214567 A) (Year: 2008).*
Machine Translation of Umeyama et al. (JP 2004315690 A) (Year: 2004).*
International Search Report from corresponding International Application No. PCT/CN2021/115538, mailed on Dec. 9, 2021, 2 pages.
Office Action dated Mar. 25, 2024 in related Chinese Patent Application No. 202010919549.6.

* cited by examiner

*Primary Examiner* — Callie E Shosho
*Assistant Examiner* — Bethany M Miller
(74) *Attorney, Agent, or Firm* — Tucker Ellis LLP

(57) ABSTRACT

The present disclosure relates to a coating composition and an article comprising a coating formed from the coating composition. The coating composition described herein comprises (A) at least one reactive donor capable of providing two or more nucleophilic carbanions, wherein the at least one reactive donor has an aromatic epoxy backbone, and the reactive donor has an epoxy equivalent in the range of from 400 to 1100 g/mol; (B) at least one reactive acceptor comprising two or more carbon-carbon double bond groups; (C) at least one catalyst for catalyzing the Michael addition crosslinking reaction between the at least one reactive donor and the at least one reactive acceptor; and (D) at least one hardness accelerator, including at least one monoamine compound, at least one tertiary amine compound, at least one nitrogen-containing heterocyclic compound, or a combination thereof. By applying the coating composition described herein, the resulting coating has excellent hardness, scratch resistance or both.

19 Claims, No Drawings

COATING COMPOSITION AND ARTICLE INCLUDING COATING FORMED BY THE COATING COMPOSITION

RELATED APPLICATION DATA

This application is a national phase application of International Application No. PCT/CN2021/115538 filed Aug. 31, 2021, which claims priority to Chinese Application No. 202010919549.6 filed Sep. 4, 2020.

TECHNICAL FIELD

The present disclosure relates to a coating composition. Specifically, the present application relates to a coating composition capable of forming a dense film, and to an article comprising a coating formed by the coating composition.

BACKGROUND

Traditional solvent based two-component polyurethane has been widely used in wood coating compositions because of its excellent overall properties, including drying speed, fullness, film hardness, etc. However, due to increasingly stringent environmental regulations, the standards for controlling free isocyanates (such as toluene diisocyanate, TDI) and volatile organic compounds (VOC) in coating applications have become more and more stringent. Therefore, the non-isocyanate (NICN) curing technology without any free isocyanate has attracted great attention in academic and industrial fields.

To date, there are several feasible NICN curing methods, such as polycarbodiimide (PCDI) curing, Michael addition curing and so on. However, due to the short application period, it is difficult to commercialize PCDI curing at current stage. Due to long pot life, Michael addition curing has achieved great success and has been commercially promoted. The Michael addition curing technology is particularly attractive, because this coating system has many advantages, including (1) applicability at room temperature or even lower temperature, (2) very low solvent content, (3) very long pot life, (4) excellent appearance performance (e.g. gloss @ 60° of greater than 90 at and DOI greater than 90), (5) applicability for thick coating (>150 μm), (6) very good chemical resistance, (7) excellent flexibility, (8) good outdoor durability; and (9) free of isocyanate, formaldehyde and organotin. However, the hardness of the dry film obtained by Michael addition curing technology at room temperature (defined as 20° C. to 25° C.) is often much lower than that of the traditional two-component polyurethane coating, and thus cannot meet the application requirements at room temperature. As such, there is a need for a Michael Addition curing technology that can cure at room temperature and maintain such dry film hardness.

SUMMARY

Therefore, there is still a need in industry for a non-isocyanate curing system with an improved hardness of coating.

The above objective can be achieved by the coating composition described herein.

A first aspect of the present application provides a coating composition, comprising:

(A) at least one reactive donor capable of providing two or more nucleophilic carbanions, wherein the at least one reactive donor has an aromatic epoxy backbone, and the at least one reactive donor has an epoxy equivalent in the range of from 400 to 1100 g/mol;

(B) at least one reactive acceptor comprising two or more carbon-carbon double bond groups;

(C) at least one catalyst for catalyzing the Michael addition crosslinking reaction between the at least one reactive donor and the at least one reactive acceptor; and (D) at least one hardness accelerator, including at least one monoamine compound, at least one tertiary amine compound, at least one nitrogen-containing heterocyclic compound, or a combination thereof.

A second aspect of the present application provides an article, comprising at least one substrate; and the coating composition as described herein or a cured coating formed by the coating composition, coated on the at least one substrate.

The present application also provides use of at least one hardness accelerator in a coating composition. The coating formed by the coating composition of the present application has excellent hardness, scratch resistance or preferably both.

It has been found that the hardness and scratch resistance of the formed coating can be improved by using at least one reactive donor having an aromatic epoxy backbone in Michael addition curing system and adding at least one hardness accelerator capable of ring-opening polymerization with epoxy groups. This improvement is unexpected to those skilled in the art.

Moreover, by using the coating composition of the application, the obtained coating may also retain many advantages of the Michael addition curing technology described above.

The details of one or more embodiments of the present disclosure will be set forth in the description below. Other features, objects, and advantages of the present disclosure will be apparent from the description and the claims.

DETAILED DESCRIPTION

Definition

As used herein, "a", "an", "the", "at least one", and "one or more" are used interchangeably. Thus, for example, a coating composition that comprises "an" additive can be interpreted to mean that the coating composition includes "one or more" additives. As used herein, the singular forms are intended to include the plural forms as well, unless the context clearly indicates otherwise.

Throughout the present application, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned herein, as along as such components or steps do not affect the basic and novel characteristics of what is disclosed herein, but it is also contemplated that the compositions or processes may consist essentially of, or consist of, the recited components or steps.

For the sake of brevity, only certain ranges are explicitly disclosed herein. However, it should be understood that any lower limit may be combined with any upper limit to recite a range not explicitly recited, as well as, any lower limit may be combined with any other lower limit to recite a range not explicitly recited, in the same way, any upper limit may be combined with any other upper limit to recite a range not explicitly recited.

Unless otherwise indicated, the recitations of numerical ranges by endpoints include all numbers subsumed within that range. For example, a range of from 1 to 5 includes 1, 1.5, 2, 2.75, 3, 3.80, 4, 5, etc. Furthermore, disclosure of a range includes disclosure of all subranges included within the broader range. For example, a range of from 1 to 5 discloses the subranges of from 1 to 4, from 1.5 to 4.5, from 1 to 2, etc. Thus, every point or individual value may serve as a lower or upper limit combined with any other point or individual value or any other lower or upper limit, to recite a range explicitly recited in the present application.

The term "alkyl" as used herein means a straight or branched chain hydrocarbon containing from 1 to 10 carbon atoms, and preferably 1, 2, 3, 4, 5, or 6 carbons. Representative examples of alkyl include, but are not limited to, methyl, ethyl, n-propyl, iso-propyl, n-butyl, sec-butyl, isobutyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. Each of the carbon atoms of the alkyl group is substituted with 0, 1, or 2 substituents selected from acyl, acyloxy, alkoxy, alkoxyalkoxy, alkoxyalkyl, alkoxycarbonyl, alkoxyimino, alkoxysulfonyl, alkylcarbonyl, alkylsulfonyl, amido, carboxy, cyano, cycloalkyl, fluoroalkoxy, formyl, haloalkoxy, haloalkyl, halogen, hydroxy, hydroxyalkyl, mercapto, nitro, oxo and alkylthio.

The term "alkylamino" as used herein means an alkyl group, as defined herein, appended to the parent molecular moiety through a NH group. Representative examples of alkylamino include, but are not limited to, methylamino, ethylamino, isopropylamino, and butylamino.

The term "alkylcarbonyl" as used herein means an alkyl group, as defined herein, appended to the parent molecular moiety through a carbonyl group. Representative examples of alkylcarbonyl include, but are not limited to, methylcarbonyl, ethylcarbonyl, isopropylcarbonyl, n-propylcarbonyl, and the like.

The term "alkylsulfonyl" as used herein means an alkyl group, as defined herein, appended to the parent molecular moiety through a sulfonyl group. Representative examples of alkylsulfonyl include, but are not limited to, methylsulfonyl and ethylsulfonyl.

The term "alkoxy" as used herein means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "alkoxycarbonyl" as used herein means an alkoxy group, as defined herein, appended to the parent molecular moiety through a carbonyl group, as defined herein. Representative examples of alkoxycarbonyl include, but are not limited to, methoxycarbonyl, ethoxycarbonyl, isopropoxycarbonyl, and tert-butoxy carbonyl.

The term "alkoxyalkyl" as used herein means an alkoxy group, as defined herein, appended to the parent molecular moiety through an alkyl group, as defined herein. Representative examples of alkoxyalkyl include, but are not limited to, tert-butoxymethyl, 2-ethoxyethyl, 2-methoxyethyl, and methoxymethyl.

The term "cycloalkyl" as used herein means a saturated cyclic hydrocarbon group containing from 3 to 8 carbons. Examples of cycloalkyl include cyclopropyl, cyclobutyl, cyclopentyl, cyclohexyl, cycloheptyl, and cyclooctyl. Each of the carbon atoms of the cycloalkyl groups is substituted with 0, 1, or 2 substituents selected from acyl, acyloxy, alkenyl, alkoxy, alkoxyalkoxy, alkoxyalkyl, alkoxycarbonyl, alkoxyimino, alkoxysulfonyl, alkyl, alkylcarbonyl, alkylsulfonyl, alkynyl, amido, carboxy, cyano, cycloalkyl, fluoroalkoxy, formyl, haloalkoxy, haloalkyl, halogen, hydroxy, hydroxyalkyl, mercapto, nitro, and alkylthio.

The term "acyl" as used herein means an alkyl group, as defined herein, appended to the parent molecular moiety through a carbonyl group, as defined herein. Representative examples of acyl include, but are not limited to, acetyl, 1-oxopropyl, 2,2-dimethyl-1-oxopropyl, 1-oxobutyl, and 1-oxopentyl.

The term "halo" or "halogen" as used herein means Cl, Br, I, or F.

The term "haloalkyl" as used herein means at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, and 2-chloro-3-fluoropentyl.

The term "haloalkoxy" as used herein means at least one halogen, as defined herein, appended to the parent molecular moiety through an alkoxy, as defined herein. Representative examples of haloalkoxy include, but are not limited to, 2-fluoroethoxy, trifluoromethoxy, and pentafluoroethoxy.

The term "aryl" or "aromatic group" as used herein means optionally substituted phenyl, a bicyclic aryl, or a tricyclic aryl. The bicyclic aryl is attached to the parent molecular moiety through any carbon atom contained within the bicyclic aryl. Representative examples of the bicyclic aryl include, but are not limited to, dihydroindenyl, indenyl, naphthyl, dihydronaphthalenyl, and tetrahydronaphthalenyl. The tricyclic aryl is a tricyclic aryl ring system such as anthracene or phenanthrene, a bicyclic aryl fused to a cycloalkyl, a bicyclic aryl fused to a cycloalkenyl, or a bicyclic aryl fused to a phenyl. The tricyclic aryl is attached to the parent molecular moiety through any carbon atom contained within the tricyclic aryl. Representative examples of tricyclic aryl ring include, but are not limited to, anthracenyl, phenanthrenyl, azulenyl, dihydroanthracenyl, fluorenyl, and tetrahydrophenanthrenyl.

The carbon atoms of the aryl groups may be optionally substituted with one or more substituents independently selected from acyl, acyloxy, alkenyl, alkoxy, alkoxyalkoxy, alkoxyalkyl, alkoxycarbonyl, alkoxyimino, alkoxysulfonyl, alkyl, alkylcarbonyl, alkylsulfonyl, alkynyl, amido, carboxy, cyano, cycloalkyl, fluoroalkoxy, formyl, haloalkoxy, haloalkyl, halogen, hydroxy, hydroxyalkyl, mercapto, nitro, and alkylthio. Where the aryl group is a phenyl group, the number of substituents is 0, 1, 2, 3, 4, or 5. Where the aryl group is a bicyclic aryl, the number of substituents is 0, 1, 2, 3, 4, 5, 6, 7, 8, or 9. Where the aryl group is a tricyclic aryl, the number of substituents is 0, 1, 2, 3, 4, 5, 6, 7, 8, or 9.

The term "arylalkyl" as used herein means an aryl group, as defined herein, appended to the parent molecular moiety through an alkyl group, as defined herein. Representative examples of arylalkyl include, but are not limited to, benzyl, 2-phenylethyl and 3-phenylpropyl.

The term "heteroaryl" as used herein may be monocyclic or bicyclic. The carbon atoms of the heteroaryl group may be optionally substituted with one or more substituents independently selected from acyl, acyloxy, alkenyl, alkoxy, alkoxyalkoxy, alkoxyalkyl, alkoxycarbonyl, alkoxyimino, alkoxysulfonyl, alkyl, alkylcarbonyl, alkylsulfonyl, alkynyl, amido, carboxy, cyano, cycloalkyl, fluoroalkoxy, formyl, haloalkoxy, haloalkyl, halogen, hydroxy, hydroxyalkyl, mercapto, nitro, and alkylthio. Monocyclic heteroaryl or 5- or 6-membered heteroaryl rings are substituted with 0, 1, 2, 3, 4, or 5 substituents. Bicyclic heteroaryl or 8- to 12-membered bicyclic heteroaryl rings are substituted with 0, 1, 2, 3, 4, 5, 6, 7, 8, or 9 substituents. Heteroaryl groups disclosed herein may be present as tautomers.

As used herein, the term "Michael Addition" refers to the nucleophilic addition of a carbanion in a reactive donor to a carbon-carbon double bond in a reactive acceptor. A Michael Addition reaction follows the general reaction schematic shown here:

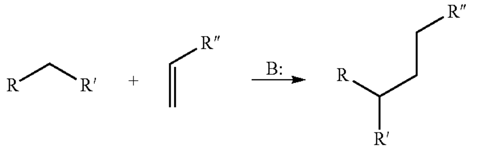

In the reaction schematic shown above, B: represents a latent catalyst, which reacts with a Michael addition reactive donor by abstraction of a proton to form a carbanion for subsequent addition reaction with the Michael addition reactive acceptor.

As used herein, the term "carbon-carbon double bond group" refers to a structure containing a carbon-carbon double bond in its molecule, but not including a benzene ring. Examples of a carbon-carbon double bond group include, but are not limited to, —C═C—C═C—, —C—C—C≡C—, —C═C—CHO, —C═C—CO—, —C═CC(O)O—, and —C═C—CN.

As used herein, the term "nucleophilic carbanion" refers to an active intermediate of carbon with a lone pair of electrons to which two or three strong electronegative groups are attached. The strong electronegative groups may include, but is not limited to, $—NO_2$, —C(═O)—, $—CO_2R_1$, $—SO_2—$, —CHO, —CN, and $—CONR_2$, etc., wherein $R_1$ and $R_2$ each independently represent an alkyl group. In some embodiments, the nucleophilic carbanion is derived from an acidic proton C—H in activated methylene or methine group.

As used herein, the term "aromatic epoxy backbone" refers to a backbone structure with a closed aromatic ring or ring system derived from an epoxy resin, wherein the aromatic ring or ring system is rigid and different from flexible alkanes or cycloalkyl such as cyclohexyl. Examples of the aromatic ring structure include, but are not limited to, phenylene, naphthylene, biphenyl, fluorenylene and indenyl, and heteroarylene (e.g., a closed aromatic or aromatic cyclic hydrocarbon or ring system, wherein one or more atoms in the ring are elements other than carbon, such as nitrogen, oxygen, sulfur, etc.).

The term "Epoxy Equivalent Weight" (EEW) in the context of "reactive donor" refers to the mass of the reactive donor containing 1 mol of epoxy groups. In the case where the reactive donor is an acetoacetate functional epoxy, the epoxy equivalent refers to the mass of the acetoacetate functional epoxy containing 1 mol of epoxy groups. Generally, the lower the epoxy equivalent weight, the more epoxy groups contained in the reactive donor are, and the higher the reactivity is.

The term "glass transition temperature (Tg)" in the context of "reactive donor" refers to the glass transition temperature of the reactive donor, which is for example determined by differential scanning calorimetry.

The term "glass transition temperature (Tg)" in the context of "reactive acceptor" refers to the glass transition temperature of the homopolymer formed by the homopolymerization of the reactive acceptor molecules, which is for example determined by differential scanning calorimetry.

The term "on" when used in the context of a coating applied on a substrate means that the coating is applied directly or indirectly on the substrate. In some embodiments of the present disclosure, the coating composition according to the present application is at least partially applied directly on the wood substrate without adhesion problems. In some embodiments of the present disclosure, one or more adhesion promoting layers may exist between the coating composition according to the present disclosure and the wood substrate to obtain the desired adhesion.

As used herein, the term "pot life" is the time within which, once the components of a coating composition have been mixed, the viscosity of the system doubles; or for a system in which the viscosity will not increase significantly with time, it refers to the maximum time when the coating formed by the coating composition can meet the requirements of performance indicators. The pot life is also referred to as working time or useable life. Unless otherwise specified, the pot life usually refers to the pot life at room temperature (20 to 25° C.).

The term "comprises", "comprising", "contains" and variations thereof do not have a limiting meaning, but rather these terms in the description and claims are intended to be open-ended.

The terms "preferred" and "preferably" refer to embodiments of the present disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

According to the first aspect of the present disclosure, a coating composition is provided, comprising (A) at least one reactive donor capable of providing two or more nucleophilic carbanions, wherein the at least one reactive donor has an aromatic epoxy backbone, and the at least one reactive donor has an epoxy equivalent in the range of from 400 to 1100 g/mol, preferably in the range of from 470 to 1000 g/mol, more preferably in the range of from 470 to 900 g/mol; (B) at least one reactive acceptor comprising two or more carbon-carbon double bond groups; (C) at least one catalyst for catalyzing the Michael addition crosslinking reaction between the at least one reactive donor and the at least one reactive acceptor; and (D) at least one hardness accelerator, including at least one monoamine compound, at least one tertiary amine compound, at least one nitrogen-containing heterocyclic compound, or a combination thereof.

In the coating composition of the embodiments of the present application, at least one hardness accelerator (D) is at least one amine compound, which can promote the ring-opening reaction of epoxy group in the at least one reactive donor (A) for ionic polymerization. By adding at least one hardness accelerator (D) to the coating composition of the present application, the crosslinking degree of the system can be further increased, which helps to improve the denseness (compactness) of the cured coating, as well as the hardness and scratch resistance of the cured coating.

In some embodiments of the present application, the at least one hardness accelerator (D) is used to catalyze the ring opening of epoxy groups in the at least one reactive donor (A) for ionic polymerization, and does not participate in the crosslinking reaction itself.

The at least one hardness accelerator (D) may include at least one monoamine compound, at least one tertiary amine compound, at least one nitrogen-containing heterocyclic compound, or a combination thereof.

As defined above, at least one monoamine compound is a compound containing one primary amine (—$NH_2$) or one secondary amine (—NH—) in the molecule. Preferably, the monoamine compound has only one nitrogen atom in the molecule. More preferably, the nitrogen atom in the monoamine compound in this paper is not on a ring, that is, the nitrogen atom in the monoamine compound is not a heterocyclic nitrogen atom.

In some embodiments, the at least one monoamine compound is an aliphatic amine compound, preferably a saturated aliphatic amine compound, particularly preferably an aliphatic amine compound having an alkoxysilane group. Examples of the at least one monoamine compound include, but are not limited to, dimethylamine, diethylamine, dipropylamine, diisopropylamine, dibutylamine, bis-(2-ethylhexyl)-amine, 3-aminopropyltriethoxysilane, and bis(γ-trimethoxysilyl propyl) amine. Preferably, the at least one monoamine compound may be one or more of diethylamine, 3-aminopropyltriethoxysilane and bis(γ-trimethoxysilyl propyl) amine. Particularly preferably, the at least one monoamine compound is or contains 3-aminopropyltriethoxysilane. It has been surprisingly found that the at least one monoamine compound with the above preferences can significantly improve not only the hardness of the cured coating, but also the scratch resistance of the coating.

At least one tertiary amine compound is an amine compound in which all hydrogen atoms on the nitrogen atom have been substituted. The hydrogen atoms on the nitrogen atom in at least one tertiary amine compound may be substituted by alkyl or arylalkyl, that is, alkyl or arylalkyl substituents may be on the nitrogen atom. For example, the hydrogen atom on the nitrogen atom in the at least one tertiary amine compound may be substituted by $C_{1-6}$ alkyl, preferably methyl, or may be substituted by arylalkyl, preferably arylalkyl with —OH. In some embodiments, the at least one tertiary amine compound may be one or more selected from triethylamine, benzyldimethylamine, dimethylaminomethylphenol (DMP-10), 2,4-bis(dimethylaminomethyl)phenol (DMP-20) and 2,4,6-tris(dimethylaminomethyl)phenol (DMP-30).

In some embodiments, the at least one nitrogen-containing heterocyclic compound is an aromatic heterocyclic compound. It is known in the art that the aromatic heterocyclic compound themselves have a special π electron aromatic ring. Preferably, the at least one nitrogen-containing heterocyclic compound is a single heterocyclic compound or a fused heterocyclic compound. In some preferred embodiments, the at least one nitrogen-containing heterocyclic compound also have a ring containing —NH— bond, in addition to the special π electron aromatic ring. Thus, in some embodiments, the at least one nitrogen-containing heterocyclic compound may also be regarded as an amine compound containing at least one an aromatic heterocyclic ring.

In some embodiments, the at least one nitrogen-containing heterocyclic compound has a five-membered ring containing —NH— bond (i.e. a five-membered aza-heterocyclic ring). The five-membered ring preferably has 2 to 4 ring-nitrogen atoms, and more preferably 3 ring-nitrogen atoms. In some embodiments, the at least one nitrogen-containing heterocyclic compound may comprise one or any combination of triazole (such as 1,2,4-triazole), tetrazole, imidazole, pyrazole and 2-ethyl-4-methylimidazole.

Optionally, the five-membered ring may be fused with at least one benzene ring, wherein the benzene ring may be optionally substituted or optionally comprise nitrogen (optionally aza-benzene ring). In some embodiments, the benzene ring is unsubstituted. In some embodiments, the benzene ring is unaze- (does not comprise nitrogen). In some embodiments, the benzene ring is unsubstituted and unaze-.

In some other embodiments, in the at least one nitrogen-containing heterocyclic compound, the benzene ring is substituted. For example, the benzene ring may be substituted with one or more of hydroxyl, alkyl, alkylamino, alkylcarbonyl, alkylsulfonyl, alkoxy, alkoxycarbonyl, alkoxyalkyl, alkoxyimino, alkoxysulfonyl, alkylthio, cycloalkyl, acyl, halogen, haloalkyl, haloalkoxy, hydroxyalkoxy, aryl, arylalkyl and heteroaryl. Preferably, the benzene ring may be substituted with one or more of alkyl, alkyl amino, cycloalkyl, halogen, haloalkyl, haloalkoxy, aryl, arylalkyl and heteroaryl.

In some embodiments, in the at least one nitrogen-containing heterocyclic compound, the benzene ring may contain one or more nitrogen atoms (may be one or more aza-). Preferably, the benzene ring contains one or two nitrogen atoms (is one or two aza-).

In some embodiments, in the at least one nitrogen-containing heterocyclic compound, the aza-heterocyclic ring is fused with benzene ring. In some embodiments, the at least one nitrogen-containing heterocyclic compound may comprise one or any combination of benzotriazole (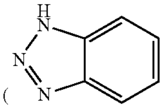), benzimidazole (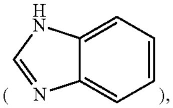), indole (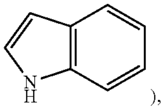), purine (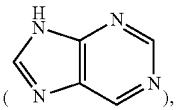), and phthalimide ( 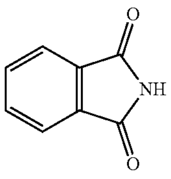 ), As described above, the benzene ring may be optionally substituted or optionally aza-. The preferences of substituents are as described above.

In some exemplary embodiments, the at least one nitrogen-containing heterocyclic compound comprises one or more of triazole, tetrazole, imidazole, benzotriazole, benzimidazole, 2-ethyl-4-methylimidazole, indole, and phthalimide. Preferably, the nitrogen-containing heterocyclic compound comprises one or any combination of benzotriazole, 1,2,4-triazole, benzimidazole, and indole. Particularly preferably, the at least one nitrogen-containing heterocyclic compound comprises one or any combination of benzotriazole and 1,2,4-triazole. As described above, the benzene ring may be optionally substituted or optionally aza-. The preferences of substituents are as described above.

In some preferred embodiments, the at least one hardness accelerator (D) has a molecular weight of less than about 800 g/mol. More preferably, the molecular weight of the at least one hardness accelerator (D) is less than about 500 g/mol, even more preferably less than about 400 g/mol. The molecular weight of the at least one hardness accelerator (D) may be greater than about 50 g/mol, more preferably greater than about 70 g/mol. In some exemplary embodiments, the molecular weight of the at least one hardness accelerator (D) is about 75 g/mol, about 100 g/mol, about 120 g/mol, about 150 g/mol, about 200 g/mol, about 250 g/mol, about 300 g/mol, and about 350 g/mol.

It should be noted that "polyamide" and "polyamine" that may be used as epoxy curing agent in the art do not belong to the hardness accelerators in this application.

Generally, curing reaction between polyamide curing agent and epoxy resin requires high-temperature baking at 60-80° C., while the embodiments of the present application may be cured at room temperature. At room temperature, polyamide curing agents cannot fully crosslink with epoxy groups, so the desired hardness and scratch resistance cannot be obtained. In addition, polyamide curing agents are usually synthesized from diamine compounds and dicarboxylic acid compounds, so some free carboxylic acid compounds may remain, which is unfavorable to the Michael addition reaction of alkaline system.

The term "polyamine" refers to a compound containing two or more amino groups ($-NH_2$) in a molecule. It has been found that in the curing system of the present application, the polyamines commonly used in the art may lead to ring opening of epoxy group for crosslinking reaction and improve the hardness or scratch resistance of the coating to a certain extent, but it will significantly shorten the pot life of coating composition, which cannot meet the general requirements for the pot life in the art.

In contrast to the above polyamides and polyamines as epoxy curing agents, it has been surprisingly found that using the hardness accelerator described herein can not only improve the hardness and scratch resistance of the coating, but also ensure that the coating composition has a satisfactory pot life.

For a multicomponent coating composition, a sufficiently long pot life is required in order to have an adequate time window for the preparation, mixing and application of the multicomponent coating composition. Considering the viscosity of the system and other performance indicators (e.g., VOC<420 g/L), a relatively long pot life (e.g., at least 2 hours) is desirable to facilitate construction. Too short pot life (e.g. less than or equal to 1 hour) may not lead to a wide use in practical application because of the difficulties in construction.

In some preferred embodiments of the present application, the coating composition may have a pot life of at least 2 hours. More preferably, the pot life may be 2.5 hours or more. Even more preferably, the pot life may be up to 3 hours or more. The upper limit of the pot life is not particularly limited. Generally, in order to facilitate construction, the pot life is not more than 20 hours, more preferably not more than 15 hours.

In some preferred embodiments, the at least one hardness accelerator (D) is present in a non-salt form. For example, 1,2,4-triazole used as at least one hardness accelerator (D) is not present in the form of alkali metal salt (e.g. potassium salt) of 1,2,4-triazole.

Preferably, the at least one hardness accelerator (D) is present in a non-salt form dissolved in at least one diluent. Thus, in some preferred embodiments, the coating composition of the present application may also comprise at least one diluent. A suitable diluent may be at least one aqueous diluent, at least one organic diluent, or a mixture thereof. Examples of suitable organic diluent include, but are not limited to, aliphatic solvents; aromatic and/or alkylated aromatic solvents (e.g. toluene, xylene, etc.); alcohols (e.g. isopropanol, n-butanol); esters (such as propyl methoxyacetate, ethyl acetate, butyl acetate, isobutyl acetate, etc.); ketones (such as methyl ethyl ketone, methyl n-amyl ketone, etc.); glycol ether; glycol ether esters, and mixtures or combinations thereof.

Examples of the at least one diluent include, but are not limited to, ethanol, isopropanol (IPA), butanol, butoxydiglycol, butyl glycol, dipropylene glycol methyl ether (DPM), propylene glycol methyl ether, ethylene glycol butyl ether, dipropylene glycol butyl ether (DPnB), ethylene glycol ethyl ether, ethylene glycol monomethyl ether, ethylene glycol monohexyl ether, ethylene glycol monon-butyl ether, diethylene glycol monomethyl ether, diethylene glycol mononbutyl ether, tripropylene glycol monomethyl ether, ethylene alcohol monoisobutyl ether, diethylene glycol monoisobutyl ether, propylene glycol monoisobutyl ether, ethylene glycol monophenyl ether, propylene glycol monophenyl ether, diethyloxymethane, dimethoxymethane, ethylene glycol monomethyl ether acetate, acetone, methyl ethyl ketone, methyl isobutyl ketone, cyclohexanone, toluene, xylene, trimethylbenzene, solvent naphtha-100, 2-methylpropyl acetate, propylene glycol methyl ether acetate (PMA), ethyl acetate and butyl acetate (BAC) and any combination thereof. More preferably, the at least one diluent is one or more selected from propylene glycol methyl ether acetate, isopropanol, ethyl acetate, butyl acetate, diethyloxymethane and dimethoxymethane.

In order to achieve Michael addition curing, the coating composition of the present application comprises at least one reactive donor (A), at least one reactive acceptor (B) and at least one catalyst (C).

The at least one reactive donor (A) is capable of providing two or more nucleophilic carbanions. As described above, the nucleophilic carbanion refers to an active intermediate of carbon with a lone pair of electrons to which two or three strong electronegative groups are typically attached. As an example of the strong electronegative groups, it may be selected from one or more of the following —$NO_2$, —C(═O)—, —$CO_2R_1$, —$SO_2$—, —CHO, —CN, and —$CONR_2$, and the like, wherein $R_1$ and $R_2$ may represent an alkyl group.

According to some embodiments of the present application, the nucleophilic carbanion of the at least one reactive donor may be derived from an acidic proton C—H in activated methylene or methine group. Suitable examples capable of providing above acidic proton comprise, without limitation, dialkyl malonates (e.g., dimethyl malonate, diethyl malonate, and the like), cyanoacetates (e.g., methyl cyanoacetate, ethyl cyanoacetate, and the like), acetoacetates, propionyl acetates, acetylacetone, dipropionyl methane and the like, and mixture or combination thereof.

According to some embodiments, the at least one reactive donor is obtained by reacting an aromatic compound with an acetoacetate or malonate compound. Preferably, the aromatic compound is an aromatic epoxy resin and/or an aromatic polyester. Without wishing to be bound by theory, the at least one reactive donor containing aromatic ring structure may provide a cured coating with improved hardness.

According to an embodiment of the present application, the at least one reactive donor is derived from an aromatic epoxy resin having an aromatic epoxy backbone. Preferably, the aromatic epoxy backbone is derived from bisphenol A, bisphenol F, phenolic epoxy resin and mixtures or combinations thereof. Suitable aromatic epoxy resins that can be functionalized to act as reactive donors include, but are not limited to, bisphenol A epoxy resin, bisphenol F epoxy resin and phenolic varnish epoxy resin. The epoxy resin can be functionalized by, for example, reacting with diketene, transesterifying with an alkyl acetoacetate or dialkyl malonate, esterficiation with malonic acid or a monoester or acid functional malonate polyester and the like.

In a preferred embodiment of the application, the at least one reactive donor is obtained by transesterification of epoxy resin with alkyl acetoacetate or dialkyl malonate, wherein the malonate or acetoacetate functional group is present in the backbone, side chain or both, preferably in the side chain. In an exemplary embodiment, the at least one reactive donor is obtained by transesterification of an epoxy resin with an alkyl acetoacetate, such as tert-butyl acetoacetate (t-BAA).

In an embodiment where the at least one reactive donor has an aromatic polyester backbone, the aromatic polyester backbone is derived from a dicarboxylic acid component comprising phthalic acid and its anhydride, terephthalic acid and its anhydride, isophthalic acid and its anhydride, or any combination thereof. As an exemplary illustration, a suitable aromatic polyester resin that can be functionalized to act as a reactive donor can be obtained by esterifying an aromatic acid component containing a di- or polycarboxylic acid or anhydride thereof with one or more di- or polyhydric alcohols. Examples of the aromatic di- or polycarboxylic acid includes, without limitation, phthalic acid and its anhydride, terephthalic acid and its anhydride, isophthalic acid and its anhydride, trimellitic anhydride or any combination thereof. Examples of the di- or polyhydric alcohol include, without limitation, trimethylolpropane, pentaerythritol, neopentyl glycol, diethylene glycol, 1,4-butanediol, ethylhexylpropanediol, 2,4-diethyl-1,5-pentanediol, ditrimethylolpropane, dipentaerythritol or any combination thereof. The polyester resin can be functionalized by, for example, reacting with diketene, transesterifying with an alkyl acetoacetate or dialkyl malonate, esterficiation with malonic acid or a monoester or acid functional malonate polyester and the like. In a preferred embodiment, the at least one reactive donor is obtained by transesterification of polyester resin with an alkyl acetoacetate or dialkyl malonate, wherein the malonate or acetoacetate functional group is present in the main chain, as a pendent chain, or present as both, preferably present as a pendent chain.

According to some embodiments, the aromatic structure in the epoxy backbone of the at least one reactive donor has a rigid structure. It has also been surprisingly found that the introduction of an aromatic ring or an aromatic ring system with a rigid structure into the epoxy backbone of at least one reactive donor can provide a cured coating with improved hardness, compared with that of a Michael addition cured coating with a flexible alkyl or cycloalkyl. The hardness of the cured coating may be further improved by using the at least one hardness accelerator herein.

According to one embodiment, the epoxy equivalent of the at least one reactive donor is required within a specific range. It has also been found that the epoxy equivalent of the at least one reactive donor was directly related to the VOC of the coating composition. Epoxy resin with lower epoxy equivalent may better form a film with the help of smaller amount of solvent, so the VOC emission can be relatively low. According to an embodiment, the at least one reactive donor has an epoxy equivalent in the range of from 400 to 1100 g/mol, preferably in the range of from 470 to 1000 g/mol, more preferably in the range of from 470 to 900 g/mol, and more preferably in the range of from 560 to 885 g/mol.

In some embodiments, the at least one reactive donor has a relatively high glass transition temperature. It has also been found that increasing glass transition temperature of the at least one reactive donor is beneficial for increasing hardness of the cured coating. In an embodiment of the present application, the at least one reactive donor has a glass transition temperature of 25° C. or higher. However, considering practical applications, the glass transition temperature of the at least one reactive donor should not be too high, otherwise it will negatively affect the curing of the coating and cause unnecessary VOC emissions. Therefore, the at least one reactive donor described herein preferably has a glass transition temperature in the range of 25° C. to 40° C.

The coating composition described herein comprises at least one reactive acceptor (B) comprising carbon-carbon double bond groups. Preferably, the at least one reactive acceptor has two or more carbon-carbon double bond groups, preferably two carbon-carbon double bond groups. Generally speaking, in the curing and crosslinking process of the coating, the higher the functionality of the reactant, the higher the crosslinking density of the cured coating, and the higher the hardness of the coating. However, it is surprisingly found that compared with the at least one reactive acceptor containing more than two carbon-carbon double bond groups, such as the reactive acceptor containing three carbon-carbon double bond groups or the reactive acceptor containing four carbon-carbon double bond groups, the reactive acceptor containing two carbon-carbon double bond groups is particularly advantageous for further improvement of the hardness of the cured coating in the Michael addition curing system.

According to an embodiment, the glass transition temperature of the at least one reactive acceptor may be also an important parameter affecting the hardness of the cured coating. In some embodiments, the at least one reactive acceptor has a glass transition temperature of 100° C. or higher, preferably 101° C. or higher, more preferably 102° C. or higher, and more preferably 103° C. or higher, but the glass transition temperature of the at least one reactive acceptor should not be too high. If the glass transition temperature of the at least one reactive acceptor is too high, it may adversely affect the crosslinking degree of Michael addition curing, thereby affecting the hardness of the cured coating. Generally, the glass transition temperature of the at least one reactive acceptor may be not greater than 200° C., preferably not greater than 195° C., more preferably not greater than 190° C. In a particular embodiment, the glass transition temperature of the at least one reactive acceptor may be in the range of 100-190° C., preferably in the range of 104-180° C.

In one embodiment, the at least one reactive acceptor is a reactive acceptor having two carbon-carbon double bond groups and a glass transition temperature of 100° C. or higher.

According to an embodiment, the at least one reactive acceptor has a relatively low molecular weight and usually exists in a non-polymer form. Preferably, the at least one reactive acceptor has a molar mass of 1000 g/mol or less, preferably 500 g/mol or less, more preferably 350 g/mol or less.

According to an embodiment, the carbon-carbon double bond group contained in the at least one reactive acceptor has a structure represented by the following formula I:

C═C—CX (Formula I)

in which, CX represents any one of alkenyl group, alkynyl group, aldehyde group (—CHO), ketone group (—CO—), ester group (—C(O)O—) and cyano group (—CN). Preferably, the carbon-carbon double bond group is derived from one or more of α,β-unsaturated aldehyde, α,β-unsaturated ketone, α,β-unsaturated carboxylate ester and α,β-unsaturated nitrile, preferably from α,β-unsaturated carboxylate esters.

The composition according to the present application also comprises at least one catalyst (C) for catalyzing the Michael addition crosslinking reaction between the at least one reactive acceptor and at least one reactive donor. In some embodiments, the at least one catalyst comprises a latent base catalyst.

In an embodiment of the present application, the latent base catalyst described herein is a substituted carbonate salt having the structure of formula (II):

(Formula II)

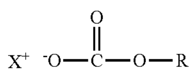

In Formula (II):

$X^+$ is a non-acidic cation. Suitable examples include, without limitation, alkali metal ion, alkali-earth metal ion, ammonium ion, phosphonium ion, and the like. Preferably, $X^+$ is a lithium, sodium, or potassium ion, and the like. More preferably, $X^+$ is a quaternary ammonium ion or a phosphonium ion;

R is H, optionally substituted C1-C10 alkyl, C6-C12 aryl, C7-C14 aralkyl or combinations thereof. Preferably, R is an unsubstituted alkyl group having 1 to 4 carbon atoms. If the R group is substituted, the substituents are selected so as to not substantially interfere with the crosslinking reaction. In order to avoid interference with the action of the base catalyst, acidic substituents, such as carboxylic acid substituents, are present only in an immaterial amount, or absent altogether.

In an embodiment, the latent base catalyst described herein is a compound with the general structure shown in Formula (II), wherein the cation $X^+$ is linked with the carbonate group of Formula (II) in a single molecule. That is the latent base catalyst has the general structure shown in Formula (II-1):

(Formula II-1)

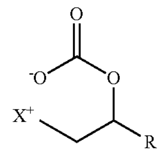

in the formula (II-1), R and $X^+$ are defined as above.

In another embodiment, the latent base catalyst described herein is a compound of the general structure shown in Formula (II), wherein the group R is a polymer, and/or the cation $X^+$ is a quaternary ammonium ion or a phosphonium ion.

In a preferred embodiment, the latent base catalyst described herein is preferably a quaternary alkyl ammonium carbonate. Suitable examples include, without limitation, tetrahexylammonium methyl carbonate, tetradecyl-trihexylammonium-methyl carbonate, tetradecylammonium: methyl carbonate, tetrabutylammonium methylcarbonate, tetrabutylammonium ethylcarbonate, benzyltrimethylammonium methyl carbonate, trihexylmethylammonium methyl carbonate or trioctylmethylammonium methyl carbonate, and mixtures or combinations thereof. Preferably, the latent base catalyst described herein include tetrabutylammonium alkylcarbonate. These types of catalysts are known in the art.

Without limiting to theory, it is believed that the latent base catalyst of formula (II) functions through release of carbon dioxide during the decomposition of carbonate salt. This produces a strong base, i.e. a hydroxide, an alkoxy, or an aralkyloxy base. In a closed pot, this reaction takes place very slowly, allowing for an extended pot life. When the coating composition is at least partially applied and its surface area increases, the base is regenerated quickly as carbon dioxide escapes from the surface, allowing for faster cure (i.e. drying and hardness development) of the coating. Accordingly, the use of a latent base catalyst of formula (II) allows for optimal pot life, open time, and cure performance for the coating compositions described herein.

In some other embodiments of the present application, the at least one catalyst may also include conventional catalysts (i.e., non-latent catalysts) known to those skilled in the art that are different from the above-mentioned latent base catalysts. The non-latent catalysts may be used alone or in combination with the latent base catalyst described herein to accelerate the Michael addition reaction.

Examples of suitable non-latent catalysts include, without limitation, tetrabutyl ammonium hydroxide, ammonium hydroxide, DBU (8-Diazabicyclo[5.4.0]undec-7-ene), DBN (1,5-Diazabicyclo[4.3,0]non-5-ene), and TMG (1,1,3,3-tetramethylguanidine).

In one embodiment, the amount of at least one catalyst used herein may vary depending on the desired properties of the composition. Preferably, the composition comprises about 0.001 to 1 molar equivalent of catalyst per gram of resin solid, more preferably 0.02 to 0.07 molar equivalent of catalyst.

Preferably, according to the present disclosure, the weight ratio of the at least one catalyst to the film-forming resin composition may vary in the range of 2:100 to 8:100. Generally speaking, in the event that the weight ratio of the catalyst to the film-forming resin composition is less than 2:100, the resulting coating has a poor curing performance. While in the event that the weight ratio of the at least one catalyst to the film-forming resin composition is greater than 8:100, the operating performance of the resulting Michael addition curing coating and/or the mechanical properties of the resulting coating may be reduced. According to actual needs, an additional inert diluent may be added during the preparation of the catalyst and/or film-forming resin composition, without affecting the reactivity of the above catalyst and film-forming resin composition so as to, for example, reduce the viscosity of components. Therefore, the weight ratio of the catalyst to the film-forming resin composition is not limited to the above range, and may be adjusted according to actual needs.

The coating composition described herein may be two-component or three-component or multi-component. Preferably, the coating composition described herein is two-component or three-component.

In some exemplary embodiments, the coating composition may comprise a film-forming resin component (a), at least one catalyst component (b), and an amine solution component (c). Reactive donors and reactive acceptors can be mixed together to form part of film-forming resin component (a). Preferably, during the storage of the coating composition, component (b) and component (c) are placed separately from component (a). In this way, the storage stability of the coating composition can be greatly improved, and the premature gelation and curing can be prevented.

Based on the total weight of the film-forming resin component (a), the at least one reactive donor is present in an amount of from 50 wt. % to 75 wt. %, and the at least one reactive acceptor is present in an amount of from 15 wt. % to 30 wt. %.

In some embodiments, the coating composition of the present disclosure or the film-forming resin component (a) may optionally further comprise other additional additives commonly used in the coating composition, which additives do not adversely affect the coating composition or the cured coating obtained therefrom. Suitable additives comprise, for example, those that improve processing or manufacturing properties of the coating composition, enhance aesthetics of the composition or cured composition obtained therefrom, or improve specific functional properties or characteristics of the composition or cured product obtained therefrom (such as adhesion to the substrate). Examples of the additives that may be included include but are not limited to adhesion promoters, curing accelerators, open time regulators, pigments and fillers, surfactants, lubricants, defoamers, dispersants, UV absorbers, colorants, coalescing agents, thixotropic agents, wetting agents, leveling agents, antioxidants, stabilizers, preservatives, and fungicides for providing the required film performance as needed. The content of each optional ingredient is preferably sufficient to achieve its intended purpose, but does not adversely affect the coating composition or the cured coating obtained therefrom.

The coating composition of the present application may be prepared by the steps of: preparing the film-forming resin component, the catalyst component, and the hardness accelerator component, respectively, for later use; before the application, simply mixing the film-forming resin component with the catalyst component in a mixing device at a predetermined weight ratio. The mixed coating composition may be at least partially applied in a variety of ways that are familiar to those skilled in the art, including but not limited to spraying (e.g., air assisted, airless or electrostatic spraying), brushing, rolling, flooding and dipping. In these ways, a coating can be formed from the coating composition of the present application, and thus also falls within the protection scope what is described herein. Therefore, the present disclosure also provides a coating that can be obtained from the coating composition described herein. In an embodiment of the present disclosure, the mixed curable coating composition is applied by spraying. The curable coating composition may be applied in various wet film thickness. In an embodiment of the present disclosure, the wet film thickness may be in the range of about 100 to about 400 μm, preferably in the range of about 100 to 200 μm. The applied coating may be cured by air drying at room temperature or by accelerating drying with various drying devices (such as ovens) that are familiar to those skilled in the art.

In some embodiments of the present disclosure, after the coating composition is applied with a thickness of 150 microns and air dried for 7 days, the resulting cured coating has a pencil hardness of at least F—H, preferably at least H.

In some embodiments of the present disclosure, after the coating composition is applied with a thickness of 150 microns and air dried for 7 days, the resulting cured coating has a scratch resistance of at least about 150 g, preferably at least about 200 g.

The coating composition described herein is suitable for use in wood, metal, plastic, cement board, inner wall and outer wall applications. It is particularly suitable for use as a wood coating composition.

A second aspect of the present application provides an article, comprising at least one substrate and a cured coating formed from the coating composition as described herein that is directly or indirectly at least partially applied on the at least one substrate.

Examples of substrate may be one or more selected from wood, metal, plastic, cement board, inner wall, and outer wall. Examples of suitable substrate materials include wood, cement, cement fiber board, wood-plastic composites, tile, metal, plastic, glass, and fiberglass. In many embodiments, the coating composition is particularly suitable for use on wood substrates. Suitable wood substrates include substrates derived from wood materials such as oak (e.g., white oak and red oak), pine (e.g., white pine and southern yellow pine), poplar, spruce, cherry, walnut, redwood, cedar, maple, mahogany, birch, hickory, walnut, ash, and the like. In many embodiments, wood materials for the wood substrate include those that exhibit light colors and are susceptible to UV-light discolorations, such as oak, pine, maple, and the like. In addition, the wood substrate may be an engineered wood product, in which the substrate is prepared from wood pieces (e.g., sheets, chips, flakes, fibers, strands).

In some exemplary embodiments, wood may be one or more selected from schinopsis hardwood, chestnut, *quercus*, red chestnut, *camellia*, pressing wood, Douglas fir, Japanese cedar, American cypress, Japanese red pine, Japanese cypress, water walnut, black walnut, maple, Japanese beech, Japanese *paulownia*, birch, *shorea robusta, magnolia*, ash, teak, Chinese oak, *catalpa* wood, kapur wood, fir, oak and rubber wood.

Unless otherwise specified, the various features described herein and the corresponding preferred methods can be combined.

EXAMPLES

The present application is more particularly described in the following examples that are intended as illustrations only. Embodiments are not limited to these specific examples. Unless otherwise noted, all parts, percentages, and ratios reported in the following examples are on a weight basis. In addition, all reagents used in the examples are commercially available and used directly without further treatment. Those skilled in the art can easily purchase or prepare the raw materials used in the embodiment.

Test Methods

Pencil hardness was measured by using a pencil hardness tester according to ASTM D3363 standard.

Scratch resistance of a coating was measured by pushing the test plate under the arc (ring or ring) scratch needle according to ASTM 5178-98. After the coating was cured, the scratch needle was installed to press down on the surface of the test plate at an angle of 45°. Load on the test plate was increased step by step until the coating was scratched. The maximum load value of "pass" was recorded.

Pot life: was measured by mixing the components of the coating composition at room temperature, testing the initial viscosity of the coating composition with Iwata cup 2, and then measuring the viscosity and VOC of the system at regular intervals. The pot life of the coating composition is the time taken for the system viscosity to rise to twice the initial viscosity and the VOC of the system does not exceed 420 g/L.

Example 1: Preparation of Acetoacetate Epoxy Resin

At room temperature, a four-necked flask equipped with a thermometer, a top stirrer, a gas inlet and a distillation device was charged with 220.30 g of epoxy resin (EEW: 471 g/mol) and 79.70 g of tert-butyl acetoacetate (t-BAA). $N_2$ gas was supplied through the gas inlet for providing $N_2$ protection. Then, the resulting reaction mixture was slowly heated to about 130° C., the distillate (tert-butanol) was collected, and the system was maintained at this temperature until the distillation temperature did not exceed 78° C. Under this condition (at distillation temperature of 78° C. or less), the temperature of the mixture was raised to 160° C. When the temperature of mixture reached 160° C., it was kept for a while until the distillation temperature was below 60° C. After distillation, the mixture was then cooled to below 100° C. and then mixed with 102.96 g of n-butyl acetate (n-BA) with a solids content of about 70%. The obtained resin was used as a reactive donor and characterized.

The results showed that the acetoacetate epoxy resin had an epoxy equivalent of 560 $g \cdot mol^{-1}$, TG of 27° C., a number average molecular weight Mn of 1650 g/mol, a weight average molecular weight of 3842 g/mol and a PDI of 2.3.

Example 2: Formulation of Coating Composition

According to the components and amounts shown in Table 1, first, component (a) and component (c) were prepared respectively, and then the components were mixed. The amine solution in component (c) of compositions 2-13 refers to the solution obtained by dissolving the amine compounds listed in Table 2 in a mixed solvent at 2% by weight.

TABLE 1

| | Composition 1 | Compositions 2-13 | Category |
|---|---|---|---|
| Component (a) | | | |
| Resin, g | 64 | 64 | Reactive Donor |
| dipropylene glycol diacrylate, g | 24.4 | 24.4 | Diluent |
| Solution of a silicone-modified polyacrylate, g | 0.2 | 0.2 | Wetting Agent |
| Solution of polymers and polysiloxanes, g | 0.2 | 0.2 | Defoamer |
| Polyether modified solysiloxane, g | 0.2 | 0.2 | Leveling Agent |
| Butyl acetate (BAC), g | 6 | 6 | Diluent |
| isopropanol (IPA), g | 5 | 5 | Diluent |
| Component (b) | | | |
| Catalyst, g | 4.24 | 4.24 | Catalyst |
| Component (c) | | | |
| PMA/IPA/BAC = 3/3/4, mass ratio | 20 | / | Diluent |
| Amine solution (2 wt. % in PMA/IPA/BAC = 3/3/4) | / | 20 | Diluent containing hardness accelerator |

The pot life of coating compositions 1-13 were measured.

The coating compositions 1-13 were applied on the test plate with a thickness of 150 microns and dried at room temperature for 7 days. Then, the properties of cured coating samples 1-13 were tested respectively. Component (c) and the results of coating performance of each sample were shown in Table 2.

TABLE 2

| Composition | Amine | Pot life (hour) | Pencil hardness | Scratch resistance |
|---|---|---|---|---|
| 1 | None | 3 | F | 100 g |
| 2 | Polyamide curing agent 1 | 3 | F | 100 g |
| 3 | Polyamide curing agent 2 | 3 | F | 100 g |
| 4 | 4,4'-Diaminodicyclohexyl methane (PACM) | 1 | H | 200 g |
| 5 | Triethylenetetramine | 0.5 | H | 200 g |
| 6 | Benzotriazole | 3 | H | 200 g |
| 7 | Tetrazole | 3 | H | 150 g |
| 8 | Imidazole | 2.5 | H | 150 g |
| 9 | 1,2,4-Triazole | 2.5 | H | 200 g |
| 10 | Diethylamine | 2.5 | H | 200 g |
| 11 | Triethylamine | 3 | F-H | 150 g |
| 12 | 3-aminopropyltriethoxysilane | 2.5 | H-2H | 200 g |
| 13 | bis(trimethoxysilylpropyl)amine | 2 | H | 200 g |

According to the experimental results shown in Table 2 for the coating Composition 1, when only Michael addition curing reaction occurs, the resulting coating has low hardness and scratch resistance.

Polyamide curing agents used in coating Compositions 2 and 3 are all commercially available polyamide epoxy curing agents. The coatings formed by coating Compositions 2 and 3 do not show improved hardness and scratch resistance, compared with coating Composition 1 without amine component. According to the above discussion, this is related to the condition that the curing reaction between polyamide curing agent and epoxy resin requires high temperature baking at 60-80° C.

In coating Compositions 4 and 5, polyamine compounds were used as amines. The coating formed by them has improved hardness and scratch resistance. However, the pot life is short and cannot meet the general requirements in the art. Although the pot life can be prolonged by adding diluents, the addition of diluents usually increases VOC, which is not conducive to the wide application of coating composition.

From the performance data of coatings formed by coating Compositions 6-13 in Table 2, it can be seen that the hardness and scratch resistance of the coating can be improved by using the hardness accelerator described herein, and the pot life can meet the requirements. It can also be seen that when benzotriazole, triazole, diethylamine, 3-aminopropyltriethoxysilane, and bis(trimethoxysilylpropyl)amine are used, the hardness and scratch resistance of the coating are significantly improved. In particular, when KH550 is used, the hardness is even increased to H-2H.

Some exemplary embodiments of the present invention are provided as follows.

Embodiment 1: A coating composition comprising: (A) at least one reactive donor capable of providing two or more nucleophilic carbanions, wherein the at least one reactive donor has an aromatic epoxy backbone, and the at least one reactive donor has an epoxy equivalent in the range of from 400 to 1100 g/mol, preferably in the range of from 470 to 1000 g/mol, more preferably in the range of from 470 to 900 g/mol; (B) at least one reactive acceptor comprising two or more carbon-carbon double bond groups; (C) at least one catalyst for catalyzing the Michael addition crosslinking reaction between the at least one reactive donor and the at least one reactive acceptor; and (D) at least one hardness accelerator, including at least one monoamine compound, at least one tertiary amine compound, at least one nitrogen-containing heterocyclic compound, or a combination thereof. Embodiment 2: An embodiment of Embodiment 1, wherein the at least one tertiary amine compound is one or more selected from triethylamine, benzyldimethylamine, dimethylaminomethylphenol (DMP-10), 2,4-bis(dimethylaminomethyl)phenol (DMP-20) and 2,4,6-tris(dimethylaminomethyl)phenol (DMP-30).

Embodiment 3: An embodiment of any of Embodiments 1-2, wherein the at least one nitrogen-containing heterocyclic compound is an aromatic heterocyclic compound, preferably a single heterocyclic compound or a fused heterocyclic compound.

Embodiment 4: An embodiment of any of Embodiments 1-3, wherein the at least one nitrogen-containing heterocyclic compound has a five-membered ring containing —NH— bond, and the five-membered ring preferably has 2 to 4 ring-nitrogen atoms, and optionally, the five-membered ring is fused with optionally substituted or optionally azabenzene ring.

Embodiment 5: An embodiment of any of Embodiments 1-4, wherein the at least one nitrogen-containing heterocyclic compound comprises one or more of triazole, tetrazole, imidazole, pyrazole, benzotriazole, benzimidazole, 2-ethyl-4-methylimidazole, indole, purine and phthalimide.

Embodiment 6: An embodiment of any of Embodiments 1-5, wherein the at least one hardness accelerator (D) has an amount of 0.1 wt. % to 1 wt. %, based on the total weight of the coating composition.

Embodiment 7: An embodiment of any of Embodiments 1-6, further comprising at least one diluent selected from one or more of propylene glycol methyl ether acetate, isopropanol, ethyl acetate, butyl acetate, diethoxymethane, and dimethoxymethane.

Embodiment 8: An embodiment of any of Embodiments 1-7, wherein the coating composition has a pot life of at least 2 hours.

Embodiment 9: An embodiment of Embodiment 7, wherein the at least one hardness accelerator (D) is present in a non-salt form dissolved in the at least one diluent.

Embodiment 10: An article comprising: at least one substrate selected from one or more of wood, metal, plastic, cement board, inner wall and outer wall; and a cured coating formed from the coating composition of any one of Embodiments 1 to 9 that is directly or indirectly at least partially applied on the at least one substrate.

Embodiment 11: An embodiment of Embodiment 10, wherein the wood is one or more selected from schinopsis hardwood, chestnut, *quercus*, red chestnut, *camellia*, pressing wood, Douglas fir, Japanese cedar, American cypress, Japanese red pine, Japanese cypress, water walnut, black walnut, maple, Japanese beech, Japanese *paulownia*, birch, *shorea robusta, magnolia*, ash, teak, Chinese oak, *catalpa* wood, kapur wood, fir, oak and rubber wood.

While what has been described herein with respect to a number of embodiments and examples, those skilled in the art will appreciate that modifications may be made to the application without departing from the principles disclosed in the foregoing description. For example, without departing from the principles disclosed in the foregoing description, the technical solutions obtained by combining multiple features or preferred implementations described herein shall be understood to belong to the contents recorded herein. Such modifications are to be considered as included within the following claims unless the claims expressly state otherwise. Accordingly, the embodiments described in detail herein are illustrative only and do not intend to limit the scope of what is described herein which is to be given the full breadth of the appended claims and any and all equivalents thereof.

What is claimed is:

1. A coating composition comprising:

(A) at least one reactive donor capable of providing two or more nucleophilic carbanions, wherein the at least one reactive donor has an aromatic epoxy backbone, and the at least one reactive donor has an epoxy equivalent in the range of from 400 to 1100 g/mol;

(B) at least one reactive acceptor comprising two or more carbon-carbon double bond groups;

(C) at least one catalyst for catalyzing a Michael addition crosslinking reaction between the at least one reactive donor and the at least one reactive acceptor; and (D) at least one hardness accelerator dissolved in a diluent, the at least one hardness accelerator including at least one monoamine compound, at least one tertiary amine compound, at least one nitrogen-containing heterocyclic compound, or a combination thereof, wherein the at least one hardness accelerator is present in a non-salt form.

2. The coating composition according to claim 1, wherein the at least one hardness accelerator is at least one tertiary amine compound, the at least one tertiary amine compound being one or more selected from triethylamine, benzyldimethylamine, dimethylaminomethylphenol, 2,4-bis (dimethylaminomethyl) phenol and 2,4,6-tris (dimethylaminomethyl) phenol.

3. The coating composition of claim 1, wherein the at least one hardness accelerator is at least one nitrogen-containing heterocyclic compound, the at least one nitrogen-containing heterocyclic compound being an aromatic heterocyclic compound.

4. The coating composition of claim 1, wherein the at least one hardness accelerator is at least one nitrogen-containing heterocyclic compound, the at least one nitrogen-containing heterocyclic compound having a five-membered ring containing —NH— bond, wherein the five-membered ring has 2 to 4 ring-nitrogen atoms, and wherein optionally, the five-membered ring is fused with optionally substituted or optionally aza-benzene ring.

5. The coating composition of claim 1, wherein the at least one hardness accelerator is at least one nitrogen-containing heterocyclic compound, the at least one nitrogen-containing heterocyclic compound comprising one or more of triazole, tetrazole, imidazole, pyrazole, benzotriazole, benzimidazole, 2-ethyl-4-methylimidazole, indole, purine and phthalimide.

6. The coating composition of claim 1, wherein the at least one hardness accelerator (D) has an amount of 0.1 wt. % to 1 wt. %, based on the total weight of the coating composition.

7. The coating composition of claim 1, wherein the diluent is selected from one or more of propylene glycol methyl ether acetate, isopropanol, ethyl acetate, butyl acetate, diethoxymethane, and dimethoxymethane.

8. The coating composition of claim 1, wherein the coating composition has a pot life of at least 2 hours.

9. An article comprising at least one substrate selected from one or more of wood, metal, plastic, cement board, inner wall and outer wall; and a cured coating formed from the coating composition of claim 1 that is directly or indirectly at least partially applied on the at least one substrate.

10. The article according to claim 9, wherein the wood is one or more selected from schinopsis hardwood, chestnut, *quercus*, red chestnut, *camellia*, pressing wood, Douglas fir, Japanese cedar, American cypress, Japanese red pine, Japanese cypress, water walnut, black 15 walnut, maple, Japanese beech, Japanese *paulownia*, birch, *shorea robusta, magnolia*, ash, teak, Chinese oak, *catalpa* wood, kapur wood, fir, oak and rubber wood.

11. The coating composition of claim 1, wherein the at least one catalyst is a latent base catalyst.

12. The coating composition of claim 1, wherein the at least one hardness accelerator is different than a non-latent catalyst.

13. The coating composition of claim 1, wherein the at least one catalyst is present in the coating composition in an amount between about 0.001 to 1 molar equivalent of the at least one catalyst per gram of resin solid in the coating composition.

14. The coating composition of claim 1, wherein the at least one catalyst is present in the coating composition in an amount between about 0.02 to 0.07 molar equivalent of the at least one catalyst per gram of resin solid in the coating composition.

15. The coating composition of claim 1, wherein the at least one hardness accelerator includes at least one monoamine compound, the at least one monoamine compound being an aliphatic amine compound having an alkoxysilane group.

16. The coating composition of claim 1, wherein the diluent is aqueous.

17. A coating composition consisting of:

at least one reactive donor capable of providing two or more nucleophilic carbanions, wherein the at least one reactive donor has an aromatic epoxy backbone, and the at least one reactive donor has an epoxy equivalent in the range of from 400 to 1100 g/mol;

at least one reactive acceptor comprising two or more carbon-carbon double bond groups;

at least one catalyst for catalyzing a Michael addition crosslinking reaction between the at least one reactive donor and the at least one reactive acceptor;

at least one hardness accelerator dissolved in a diluent, the at least one hardness accelerator including at least one monoamine compound, at least one tertiary amine compound, at least one nitrogen-containing heterocyclic compound, or a combination thereof, wherein the at least one hardness accelerator is present in a non-salt form; and optionally, one or more additives selected from the group consisting of: adhesion promoters, curing accelerators, open time regulators, pigments and fillers, surfactants, lubricants, defoamers, dispersants, UV absorbers, colorants, coalescing agents, thixotropic agents, wetting agents, leveling agents, antioxidants, stabilizers, preservatives, and fungicide.

18. The coating composition of claim 17, wherein the at least one hardness accelerator is different than a non-latent catalyst.

19. An article comprising:

at least one substrate selected from one or more of wood, metal, plastic, cement board, inner wall and outer wall; and a cured coating formed from the coating composition of claim 17 that is directly or indirectly at least partially applied on the at least one substrate.

* * * * *